United States Patent [19]

Birke et al.

[11] 4,194,878
[45] Mar. 25, 1980

[54] PROCESS FOR THE DYEING OR PRINTING OF POLYESTER FIBERS

[75] Inventors: Walter Birke; Hans-Ulrich von der Eltz; Franz Schon, all of Frankfurt am Main, Fed. Rep. of Germany

[73] Assignee: Hoechst Aktiengesellschaft, Frankfurt am Main, Fed. Rep. of Germany

[21] Appl. No.: 903,005

[22] Filed: May 4, 1978

[30] Foreign Application Priority Data

May 7, 1977 [DE] Fed. Rep. of Germany ....... 2720661

[51] Int. Cl.² ............................................. C09B 1/00
[52] U.S. Cl. ..................................... 8/39 B; 8/39 C; 8/94 A
[58] Field of Search ..................... 8/39 B, 39 C, 94 A

[56] References Cited

U.S. PATENT DOCUMENTS

| 3,988,109 | 10/1976 | Schuierer | 8/94 R |
| 4,121,899 | 10/1978 | Chambers et al. | 8/94 A |

FOREIGN PATENT DOCUMENTS 1040501 10/1958 Fed. Rep. of Germany.
2262713 10/1975 France.
792210 3/1958 United Kingdom.

OTHER PUBLICATIONS

Colour Index (Third Edition), vol. 2, (1971), p. 2666 and vol. 4 (1971), p. 4550; C. I. 62500.
Venkataraman, K., "The Chemistry of Synthetic Dyes", vol. III, (Academic Press), 1970, pp. 385-389, 411.

*Primary Examiner*—A. Lionel Clingman
*Attorney, Agent, or Firm*—Curtis, Morris & Safford

[57] ABSTRACT

In the process for the pad-dyeing of printing or materials consisting of, or containing, polyester or polyamide fibers or filaments, in which process the materials are padded or printed in common manner with aqueous baths or printing pastes of disperse dyestuffs, and the dyestuffs are subsequently fixed by the action of liquid or gaseous methylene chloride or both of the said phases of methylene chloride, the improvement that use is made of a dyestuff of the general formula (1)

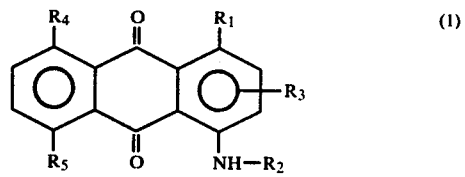

in which
$R_1$ represents $-NH_2$, $-NH-CH_2-CH_2-OH$,
$R_2$ represents hydrogen, alkyl of from 1 to 3 carbon atoms or $-(CH_2)_n-OH$, in which n stands for an integer of from 1 to 3, or phenyl, $R_3$ represents hydrogen, $-O-$alkyl $_{C_1-C_3}$,

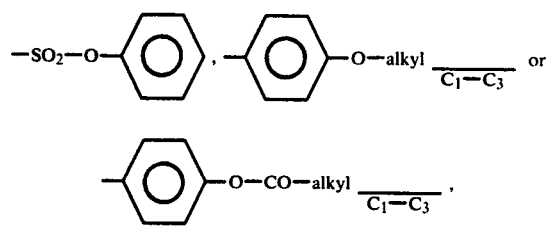

$R_4$ stands for $-OH$, $-NH_2$ or $-NH-$alkyl$_{C_1-C_3}$, and $R_5$ represents $-OH$ or $-NO_2$,
or of the general formula (2)

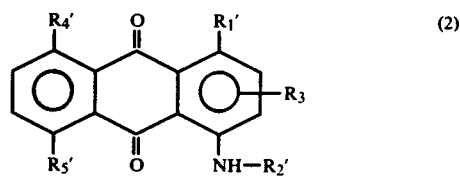

in which
$R'_1$ stands for $-OH$ or $-NH-$(n$-$ or i$-$)alkyl$_{C_1-C_4}$,
$R'_2$ for alkoxy $_{C_1-C_3}$ phenyl, $R_3$ is defined as in formula (1) above,
$R'_4$ stands for $-OH$, $-NH_2$ or $-NH-$alkyl$_{C_1-C_3}$, and $R'_5$ for $-OH$ or $-NO_2$.

1 Claim, No Drawings

PROCESS FOR THE DYEING OR PRINTING OF POLYESTER FIBERS

The present invention relates to a process for the dyeing or printing of polyester fibers.

From German Auslegeschrift No. 2 433 662 a process for the dyeing and finishing of textile goods has already been known, according to which a solution or dispersion of a dyestuff or chemical agent appropriate for application is applied onto the textile goods which are subsequently subjected to the action of air enriched with a halogenated hydrocarbon having a temperature of about 30° C. at a maximum, for the purpose of dyestuff fixation. This process comprises applying the dyestuff and/or chemical agent in an aqueous solution or dispersion onto the textile goods, for the dyeing and finishing of the textile goods of polyester fibers, and then exposing the latter to an air current which has been enriched with methylene chloride.

From German Patent Specification No. 1 040 501 a process for the dyeing of textile goods of synthetic fibers has been known, according to which the textile goods are passed first through an aqueous solution of the dyestuff and are then heated in order to eliminate water. Subsequently, the textile goods are exposed to the saturated vapor of methylene chloride for the fixation of the dyestuff, in which process the methylene chloride is condensed.

Furthermore, a process for the pad-dyeing or printing of materials consisting of, or containing, polyester or polyamide fibers or filaments has been proposed, in which process aqueous baths and/or printing pastes of disperse dyestuffs are applied in common manner onto the materials, and the dyestuffs are then fixed by a treatment with methylene chloride. This process comprises bringing the padded or printed and optionally dried material into a close contact with an accompanying material containing methylene chloride, or moistening the material bonded with an accompanying material on the side of the accompanying material with methylene chloride, and thereafter allowing the material to dwell at a temperature of up to 41° C.

According to another process proposed, in which aqueous baths and/or printing pastes of disperse dyestuffs are also applied in common manner onto materials of polyester or polyamide fibers or filaments, the fixation of the dyestuffs is effected by applying methylene chloride in a liquid form onto the padded or printed and optionally dried material by way of spraying, sprinkling, foaming, padding, or by means of rollers or brushes.

All these known or proposed processes show as common process step the dyestuff fixation in the presence of methylene chloride (or probably by the methylene chloride), wherein the methylene chloride is present in a liquid and/or gaseous phase.

It has now been found that materials which consist of, or contain, polyester or polyamide fibers or filaments can be pad-dyed or printed, in which process the materials are padded and/or printed in common manner with aqueous baths and/or printing pastes of disperse dyestuffs, and subsequently the dyestuffs are fixed by the action of liquid and/or gaseous methylene chloride, by using dyestuffs of the general formula

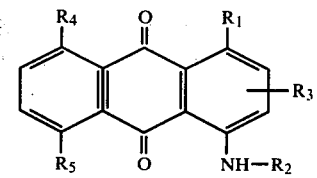

in which $R_1$ represents the group —OH, —NH$_2$ or —NH—CH$_2$—CH$_2$—OH or a —NH— (n— or i—)alkyl $C_1$-$C_4$ group, however with the exception of the group -OH, if $R_4$ and $R_5$ stand simultaneously for a hydrogen atom each, $R_2$ represents a hydrogen atom, an alkyl group of from 1 to 3 carbon atoms or the group —(CH$_2$)$_n$—OH, in which n stands for an integer of from 1 to 3, the phenyl group or an alkoxy $C_1$-$C_3$ phenyl group, however with the exception of the alkoxy $C_1$-$C_3$ phenyl group, if $R_1$ stands for a —NH—(n— or i—)alkyl $C_1$-$C_4$ group, $R_3$ is a hydrogen atom, the group —O—alkyl $C_1$-$C_3$,

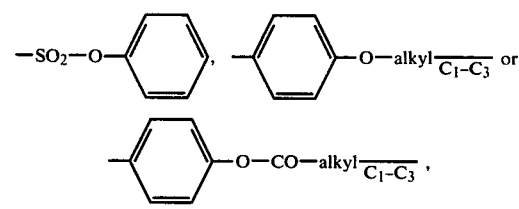

$R_4$ stands for a hydrogen atom or the group —OH, —NH$_2$ or —NH-alkyl $C_1$-$C_3$, and $R_5$ is a hydrogen atom or the group —OH or —NO$_2$.

For the dyeing processes comprising the dyestuff fixation on polyester fibers in the presence of methylene chloride, the experiences made through processes for the dyeing of polyester of the common kind are not applicable in any manner. Thus, for example, only an insufficient dyestuff yield is obtained especially with the dyestuffs of the formulae

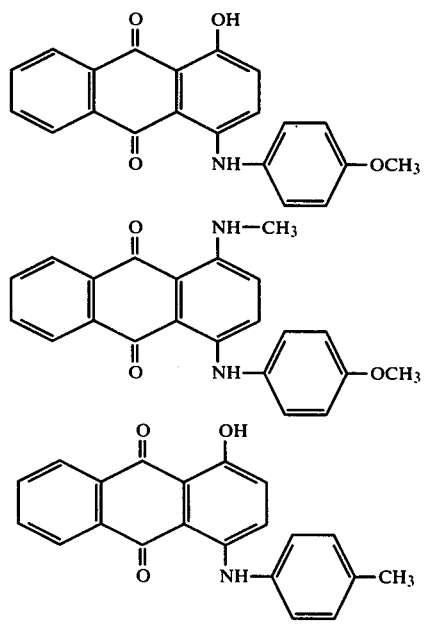

although these dyestuffs lead to very good dyestuff yields according to the conventional methods (i.e. without fixation in the presence of methylene chloride).

Of the dyestuffs of the above-mentioned formula (1), those corresponding to the formulae shown below are particularly suitable:

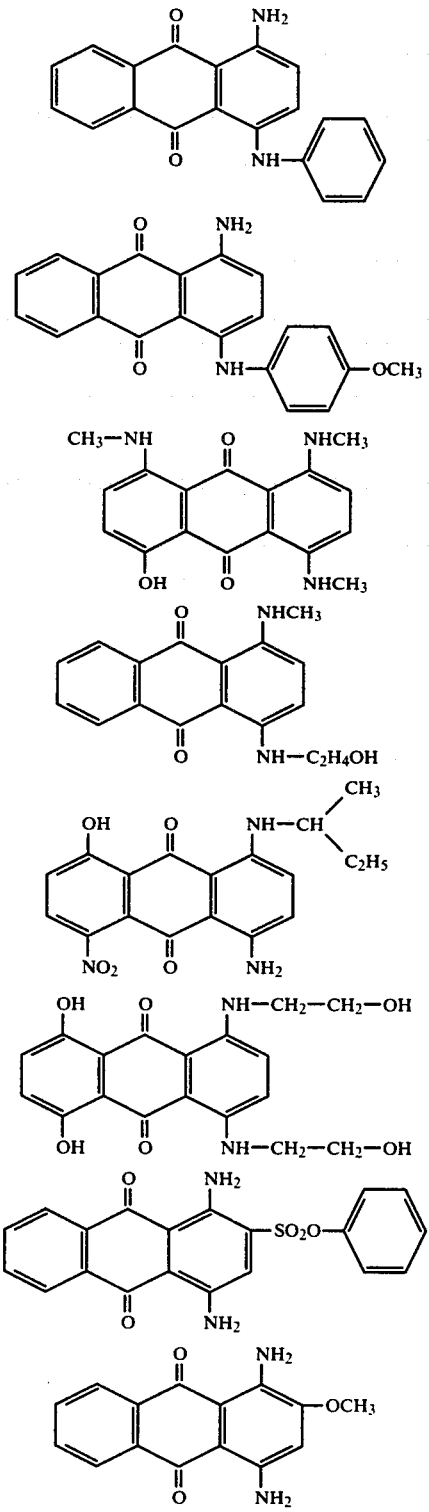

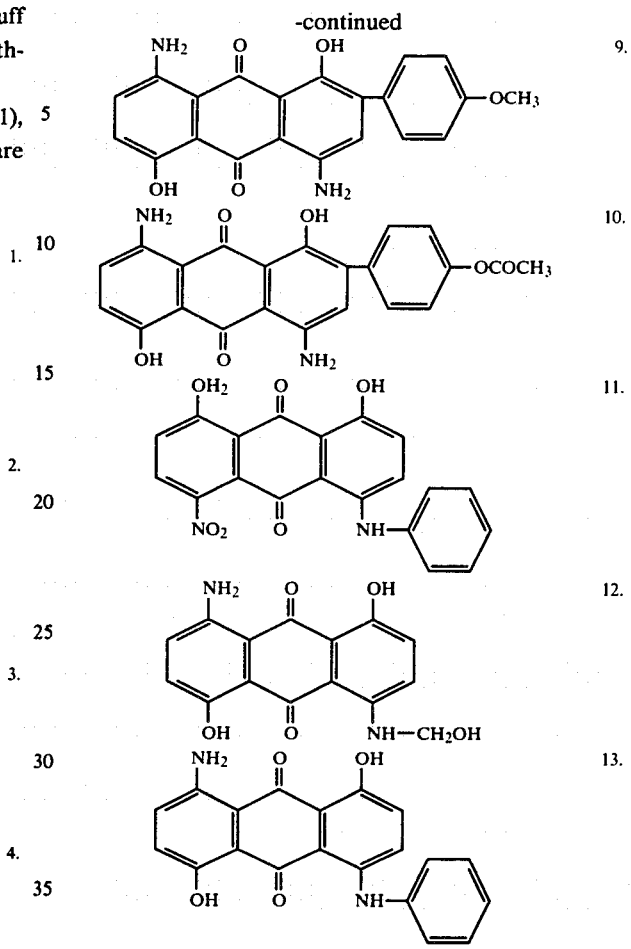

The following Examples serve to illustrate the invention.

EXAMPLE 1

A fabric of texturized polyester fibers is padded on a padder at room temperature with a liquor pick-up of 90% with an aqueous bath containing per liter 20 g of the dyestuff of the formula

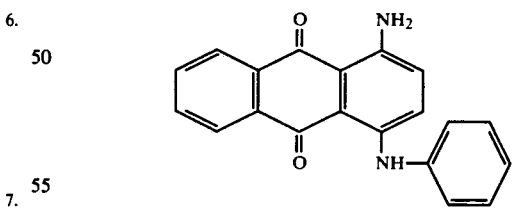

and 1 g of a commercial wetting agent.

Subsequently, the padded wet fabric is passed for 1 minute through a chamber filled with methylene chloride vapor. After the condensation has been completed, the material is wound up. Thereafter, the material is allowed to dwell in a closed container or in a sheet which is not permeable for methylene chloride for 3 hours at room temperature and is then subjected to an after-treatment in common manner.

The blue dyeing obtained shows the fastness properties that are characteristic of the dyestuff used.

EXAMPLE 2

A fabric of texturized polyester fibers is padded on a padder at room temperature with a liquor pick-up of 90% with an aqueous bath which contains per liter 20 g of the dyestuff of the formula

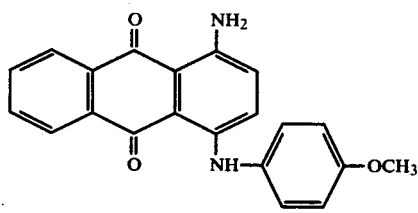

and 1 g of a commercial wetting agent.

At the same time a cotton fabric is padded with methylene chloride. Both fabrics are wound up together, while being separated by a sheet which is permeable for methylene chloride vapor. Subsequently said material is allowed to dwell for 3 hours at room temperature.

Following an after-treatment common for polyester fibers a blue dyeing is obtained which shows the fastness properties that are characteristic of the dyestuff used.

EXAMPLE 3

A textile material of texturized polyester filaments is impregnated with an aqueous dyestuff liquor which contains 20 g/l of the dyestuff of the formula

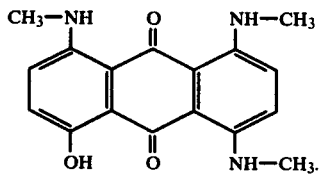

The impregnated material is wound up on a perforated cylinder. Thereafter, air enriched with methylene chloride is passed through the material roll. Following a treatment period of 4 hours at room temperature the material is treated with water vapor, and the dyeing is completed as usual by a reductive purification, as well as by rinsing and drying.

A blue dyeing is obtained which shows good fastness properties.

EXAMPLE 4

A fabric of polyester staple fibers is printed with a printing paste which contains the following components per kilogram: 20 Grams of the blue dyestuff of the formula

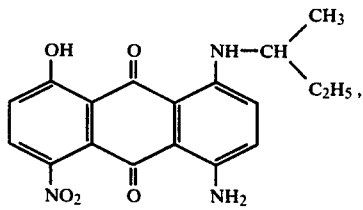

906 g of water, 50 g of a sodium alginate, 16 g of a starch ether, 6.7 g of a water softening agent on the basis of polyphosphate, and 1.3 g of citric acid.

In order to fix the dyestuff, the printed goods are then processed, as has been described in Example 2. Subsequently, they are subjected to a reductive purification treatment.

A print is obtained which shows the fastness properties that are characteristic of the dyestuff used.

EXAMPLE 5

A mixed fabric of polyester fibers and cotton (67:33) is impregnated on a padder with a liquor pick-up of about 65% with an aqueous bath which contains per liter 20 g of the dyestuff of the formula

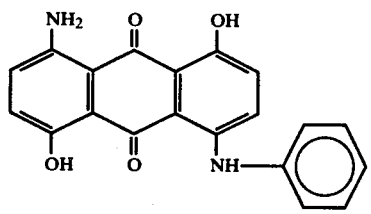

20 g of the dyestuff C.I. 18 880 (Reactive Yellow 13), 2 g of a commercial wetting agent and 12 cm$^3$ of 32.5% sodium hydroxide solution.

The padded wet fabric is then wound up together with a fabric that is moist with methylene chloride and is allowed to dwell for 6 hours, the two fabrics being separated from each other, however, by a polyethylene sheet which is permeable for methylene chloride vapor. The dyeing is completed by rinsing with cold and hot water and soaping at the boil with 1 g/l of a non-ionogenic detergent.

A bicolor dyeing is obtained (blue dyeing of the polyester portion and yellow dyeing of the cotton portion).

EXAMPLE 6

A fabric of texturized polyester fibers is padded on a padder at room temperature with a liquor pick-up of about 100% The padding liquor contains per liter of water 20 g of the dyestuff of the formula

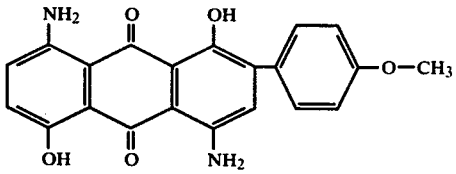

and 2 g of a commercial wetting agent. After the padding the fabric is wound up together with a second fabric that is moist with methylene chloride, the two fabrics being separated by a polyethylene sheet which is permeable for methylene chloride vapor. Subsequently, the material is allowed to dwell for 5 hours, and thereafter an alkaline reductive after-treatment common for polyester fibers is carried out.

A blue dyeing is obtained.

EXAMPLE 7

The process is carried out as has been described in Example 1, however, with the difference that instead of the dyestuff mentioned in said Example there is used the dyestuff of the formula

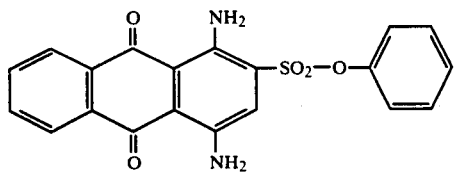

and that a car safety belt of polyester filaments of high tenacity is padded and allowed to dwell, following the winding-up, in the dwelling chamber for 3 hours at a temperature in the range of from 40° to 41° C.

An even blue dyeing is obtained with an excellent penetration of the dyestuff.

Besides, a shrinkage of about 20% is obtained, which corresponds to the common values reached in thermal processes (as in a one-minute treatment with hot air at a temperature of from 200° to 210° C.).

We claim:

1. In the process for the pad-dyeing or printing of materials consisting of, or containing, polyester or polyamide fibers or filaments, in which process the materials are padded or printed in common manner with aqueous baths or printing pastes of disperse dyestuffs, and the dyestuffs are subsequently fixed by the action of liquid or gaseous methylene chloride or both of the said phases of methylene chloride, the improvement that use is made of a dyestuff of the general formula (1)

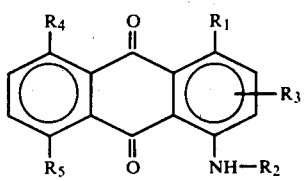

in which
$R_1$ represents $-NH_2$, $-NH-CH_2-CH_2-OH$,
$R_2$ represents hydrogen, alkyl of from 1 to 3 carbon atoms or $-(CH_2)_n-OH$, in which n stands for an integer of from 1 to 3, or phenyl, $R_3$ represents hydrogen, $-O-$alkyl $C_1$-$C_3$,

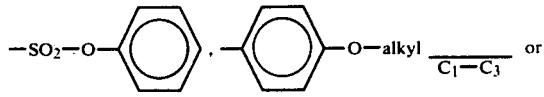

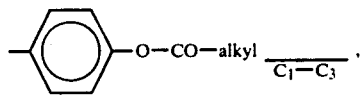

$R_4$ stands for $-OH$, $-NH_2$ or $-NH-$alkyl $C_1$-$C_3$, and
$R_5$ represents $-OH$ or $-NO_2$,
or of the general formula (2)

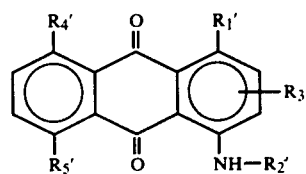

in which
$R'_1$ stands for $-OH$, or $-NH-$(n$-$ or i$-$)alkyl $C_1$-$C_4$,
$R'_2$ for alkoxy $C_1$-$C_3$ phenyl, $R_3$ is defined as in formula (1) above,
$R'_4$ stands for $-OH$, $-NH_2$ or $-NH$-alkyl $C_1$-$C_3$, and
$R'_5$ for $-OH$ or $-NO_2$.

* * * * *